Jan. 8, 1929.

R. M. CRAIG 1,698,221

METHOD OF AND APPARATUS FOR DISPLAYING SCENIC RELIEF EFFECTS

Filed Dec. 29, 1925    2 Sheets-Sheet 1

Inventor
R. M. Craig.
By Lacey & Lacey, Attorneys

Jan. 8, 1929. 1,698,221
R. M. CRAIG
METHOD OF AND APPARATUS FOR DISPLAYING SCENIC RELIEF EFFECTS
Filed Dec. 29, 1925  2 Sheets-Sheet 2
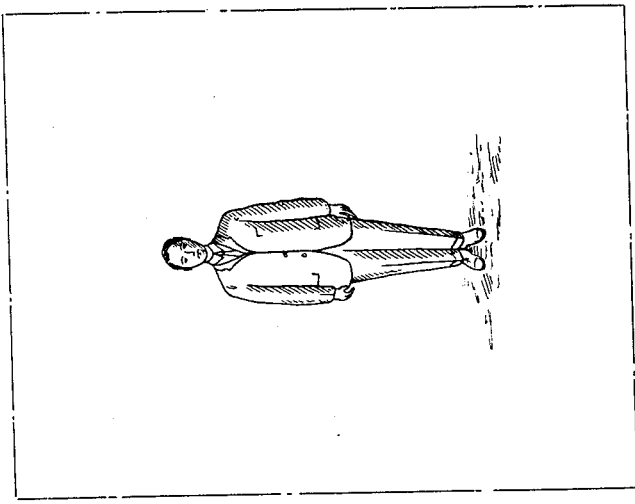
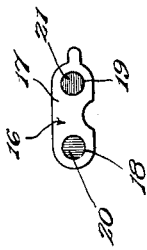
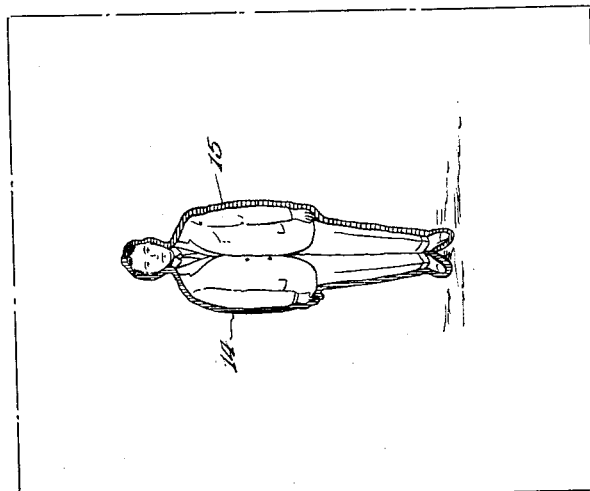
Inventor
R. M. Craig.
By Lacey Lacey, Attorneys Patented Jan. 8, 1929.

1,698,221

UNITED STATES PATENT OFFICE.

RICHARD M. CRAIG, OF SAN ANTONIO, TEXAS.

METHOD OF AND APPARATUS FOR DISPLAYING SCENIC RELIEF EFFECTS.

Application filed December 29, 1925. Serial No. 78,246.

The invention relates to a novel method of and apparatus for producing scenic relief effects.

There has heretofore been employed an arrangement whereby a silhouette of an actor or actress is projected onto a stage screen or drop and, by the movement of the actor or actress in a direction away from the audience, there is produced the effect of actual movement of the actor or actress toward and out over the audience with an increase in size of the projected image. However, in such an arrangement the curtain or screen is illuminated and the projected image is, as stated, a silhouette and therefore black, so that the features of the actor or actress are not apparent to the audience, and therefore the identity of the actor or actress is not made apparent to the audience. Therefore the present invention has for one of its objects to provide means whereby an image may be made to appear stereoscopically upon the projection screen with the features clearly visible, so that the audience is aware of the identity of the actor or actress, and movements made by the actor or actress will appear as natural as though he or she were actually visible to the audience.

Another object of the invention is to provide means for producing the effect referred to above, namely an increase in size of the projected image, and the invention contemplates an arrangement such that this is accomplished while the actor or actress is moving toward the audience, so that whereas, in the old arrangement, the actor or actress was required to move away from the audience and the movements were therefore not natural as viewed by the audience, in the present invention the natural movements incident to the actor or actress walking toward the audience are faithfully portrayed upon the screen thereby greatly increasing the attractiveness of the scenic effect produced.

Another object of the invention is to provide an arrangement whereby the image projected on the screen is represented by a combination of complementary spectral light rays, two images being projected in overlapped relation, and the composite image being viewed through color filters of corresponding colors so that the slight marginal overlap of the two projected images is obliterated and the image stands out with a bright appearance against the curtain or screen which is otherwise not illuminated, and therefore the image does not appear as a shadow or silhouette.

In the accompanying drawings:

Figure 3 is a view illustrating the appearance of the projected images upon the screen or curtain without the intervention of any color filtering means;

Figure 4 is a similar view illustrating the manner in which the image will appear when viewed through a color filtering medium;

Figure 5 is a view in elevation of a color filtering medium which may be employed by those constituting the audience.

Figure 1:
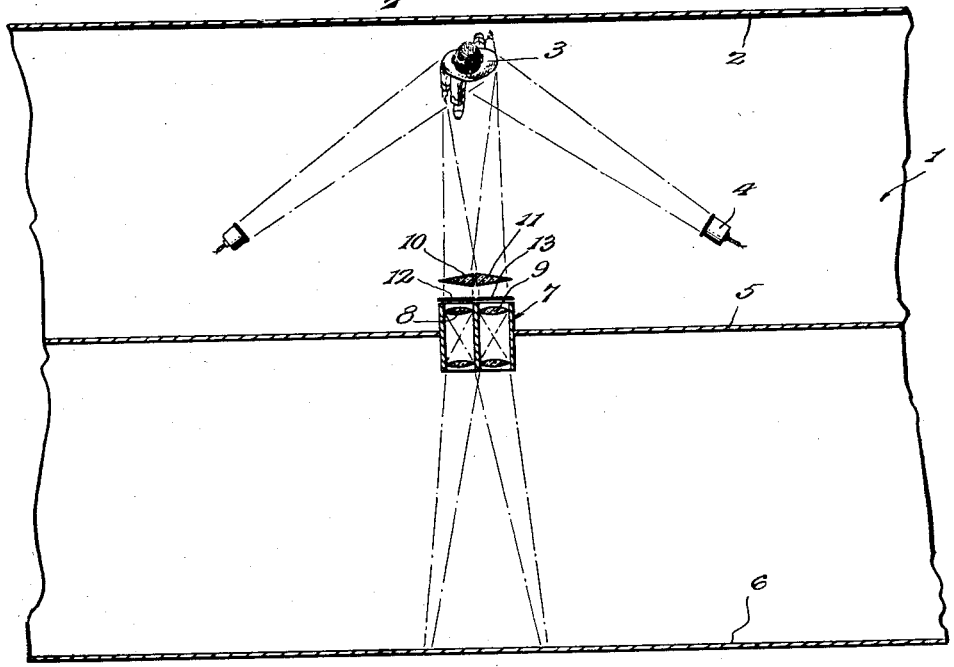
Figure 1 is a schematic view illustrating one means whereby the scenic relief effects can be obtained.

In Figure 1 the numeral 1 indicates for example the floor of a stage and the numeral 2 indicates a back drop or curtain which is preferably black in color so that the object, an image of which is to be projected, and which object is indicated by the numeral 3, will stand out in sharp contrast to the said curtain and so that no surrounding objects will be projected by which an observer, in the audience, may be able to gauge the relative distance. By the word "object" I mean an actor, an actress, or some inanimate object, or the term object may be extended to include a group of objects so that if desired articles of furniture or the like, may be positioned adjacent to the actor or actress. The numeral 4 indicates powerful spot or flood lights by which the object 3 is brilliantly illuminated, and these lights are preferably disposed in advance of the object and at opposite sides thereof and may either be adjustable and then manually adjusted by attendants to maintain the illumination of the object regardless of its position, or any desired arrangement of the lights may be made so as to illuminate the object regardless of position. These lights are of a character to project white light rays.

The numeral 5 indicates a drop or curtain which is opaque in character so that no stray light rays will be reflected onto a front curtain or drop which is indicated by the numeral 6 and which is arranged in advance of the opaque drop 5 and constitutes the screen or surface onto which the composite image is projected in a manner which will now be explained.

The numeral 7 indicates in general an optical system for stereoscopic projection comprising two projecting lens sets one indicated by the numeral 8 and the other by the numeral 9, and prisms 10 and 11 are arranged respecitively in rear of the lens sets 8 and 9. The casing of the optical system is supported in any suitable manner in an opening provided in the drop 5, and inasmuch as the drop is opaque it will be understood that no light rays can reach the curtain or screen 6, which screen is in itself preferably white in color and of thin cloth, except such rays as are transmitted through and projected by the optical system. As illustrated in the drawings, the light rays reflected from the object 3 are collected by the prisms 10 and 11 and by the lenses of the two lens sets 8 and 9, the two images are projected onto the screen 6 in a manner to produce a composite image, the two image projections being slightly overlapped so that a sterescopic effect will be obtained as will presently be explained. The numerals 12 and 13 indicate respectively color screens which are arranged between the prisms 10 and 11 and the lens sets 8 and 9 and are respectively red and blue in color. Therefore the image projected through the medium of the lens set 8 will be red and the image projected through the lens set 9 will be blue, but as the spectral colors of the light rays are complementary, the composite image projected onto the screen 6 will be of a white light character, the blending of the rays producing artificial white light. It will be observed by reference to Figure 1 and also by reference to Figure 3 that the superposed image projections are slightly overlapped so that the composite image will have a narrow fringe 14 of a red color at one side and blue fringe 15 at the other side. The spectators will be provided with a color ray filter medium such as shown in Figure 5 of the drawings and indicated by the numeral 16, and this medium comprises a sheet 17 of opaque material which is held in front of the eyes of the user and which has two circular openings 18 and 19 formed therein in which openings light ray transmitting panes 20 and 21 which are respectively red and blue in color are arranged. Upon viewing the projected composite image through the said ray filter medium, the red fringe 14 will be obliterated as well as the blue fringe 15, and the image will appear stereoscopically as in Figure 4 of the drawings.

Figure 2:
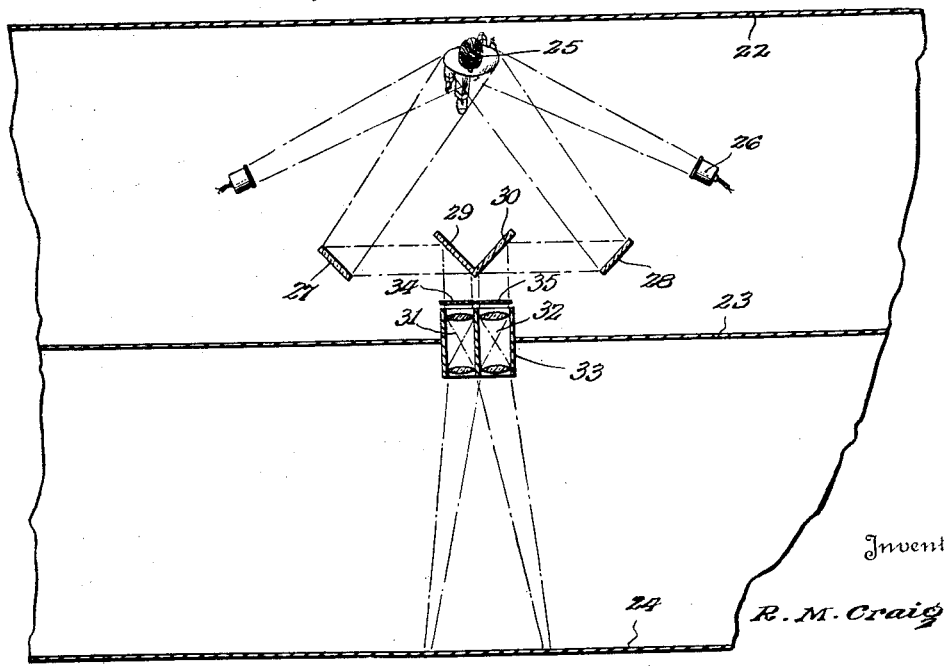
Figure 2 is a similar view illustrating another means whereby they may be obtained.

Figure 2 of the drawings illustrates a slightly different optical system, and in this figure the numerals 22, 23 and 24 indicate respectively drops and a screen, corresponding to the drop 2, the drop 5 and the screen 6 in Figure 1 of the drawings, the object being indicated by the numeral 25, and the sources of illumination being indicated by the numeral 26 and corresponding to the sources 4 of the previously described embodiment of the invention. In this embodiment the light rays reflected from the object 25 are collected by angularly disposed mirrors 27 and 28 and are reflected onto mirrors 29 and 30 respectively which are arranged edge to edge at an angle of 90° with respect to each other and with their meeting edges located midway between the optical axes of projecting lens sets 31 and 32 housed within a casing 33 arranged within an opening in the drop 23. Red and blue color screens, indicated respectively by the numerals 34 and 35 are arranged between the mirrors 29 and 30 and the lens sets 31 and 32, and by the arrangement described overlapping images of the object are projected onto the screen 24, the complementary light rays blending to produce artificial white light as in the previously described embodiment of the invention, and, red and blue fringes 14 and 15 being produced at the sides of the projected composite image, due to a slight overlap of the two image projections.

From the foregoing description of the invention it will be evident that as the performer moves in the direction of the optical system, he will appear to one using the ray filter medium 16, as though he is face to face with the observer and, in going through different gestures, he may appear to the observer as though he is about to strike him or kick him, thus producing very startling effects. As previously stated, the back drops 2 and 22 in the two embodiments illustrated in Figures 1 and 2 of the drawings, being black, afford no opportunity for the observer to gauge the distance of the actor or performer with relation to any fixed object and thus the effectiveness of the illusion is greatly enhanced. Furthermore, it will be evident that no light rays reach the screens 6 and 24 in Figures 1 and 2, except such as are projected by the respective optical systems, and that the screen is therefore substantially black and the projected composite image stands out brilliantly and in bold relief due to the stereoscopic manner of projecting the same.

It will be observed that the back drops or curtains 2 and 22 constitute non-reflecting backgrounds and that the curtains 5 and 23 constitute light ray intercepting mediums which are substantially opaque.

Having thus described the invention, what I claim is:

1. Apparatus for producing scenic relief effects comprising a projection screen, relatively laterally displaced projecting optical systems for projecting overlapping and slightly offset images of an object itself upon the screen, means for flooding said object with white light rays, means for directing the rays from each optical system with a spectral color complementary to that of the rays of the other system, and a color filter through which the composite image may be viewed.

2. Apparatus for producing scenic relief effects comprising a substantially non-reflecting background, a light ray intercepting medium arranged in advance thereof, a projection screen in advance of the said light ray intercepting medium, means for illuminating an object located between the background and the light ray intercepting medium, and relatively laterally displaced projecting optical systems arranged within the bounds of the light ray intercepting medium for projecting a composite image, of the object, upon the said screen.

3. Apparatus for producing scenic relief effects comprising a substantially non-reflecting background, an opaque medium arranged in advance thereof, a projecting screen in advance of the opaque medium, means for illuminating an object located between the background and the opaque medium, and relatively laterally displaced projecting optical systems arranged within the bounds of the opaque medium for projecting a composite image, of the object, upon the said screen.

4. Apparatus for producing scenic relief effects comprising a substantially non-reflecting background, an opaque medium arranged in advance thereof, a projection screen in advance of the opaque medium, means for illuminating an object located between the background and the opaque medium, relatively laterally displaced projecting optical systems arranged within the bounds of the opaque medium for projecting overlapping images of the object to produce a composite image, of the object, upon the screen, means for tinting the rays from each optical system with a spectral color complementary to that of the rays from the other system, and a color filter through which the composite image may be viewed, the said filter having relatively laterally displaced light ray transmitting mediums of pigment colors corresponding to the spectral colors of the projected image rays.

5. Apparatus for producing scenic relief effects comprising a substantially non-reflecting background, a light ray intercepting medium arranged in advance thereof, means between the said background and said medium for flooding an object, located in front of said background, with white light rays from opposite sides, a projection screen in advance of the light ray intercepting medium, means for projecting overlapping and slightly offset images of the object, upon the screen, each through the medium of light rays of a spectral color, to produce a composite image, of the object, the light ray colors being complementary, the screen being non-illuminated except for the rays projected thereon through the medium of the projecting means, and a color filter having light ray transmitting mediums of the same complementary colors as the light ray colors through which the composite image may be independently and simultaneously viewed.

6. The method of producing scenic relief effects which comprises providing a non-reflecting surface, placing an object in front thereof, illuminating said object by white light rays located within the optical field of the object projecting means, and independently projecting onto a screen images of the object in complementary spectral colors in overlapped relation to produce a white light composite of the images.

7. The method of producing scenic relief effects which comprises illuminating an object by white light rays in advance of a non-reflecting surface, and independently projecting onto a screen images of the object in complementary spectral colors in slightly displaced overlapped relation and blended upon the screen to produce an artificial white light composite of the images, the overlapping of the images providing color fringes corresponding to the colors of the spectral rays, and displaying the composite image through the medium of a color filter having light ray transmitting mediums of pigment colors corresponding to the spectral colors and each capable of obliterating the fringe of the respective spectral color.

In testimony whereof I affix my signature.

RICHARD M. CRAIG. [L. S.]